United States Patent [19]
Brown

[11] 3,915,341
[45] Oct. 28, 1975

[54] MANUAL FILL HOT BEVERAGE DISPENSER

[75] Inventor: Merle S. Brown, Cohasset, Mass.

[73] Assignee: Jet Spray Cooler, Inc., Waltham, Mass.

[22] Filed: Nov. 27, 1974

[21] Appl. No.: 527,526

[52] U.S. Cl. .................. 222/67; 222/108; 222/325; 137/389; 137/431
[51] Int. Cl.² ............................................ B67D 3/00
[58] Field of Search ............. 222/325, 129.1, 129.3, 222/129.4, 162, 185, 67, 146 H, 129.2, 108; 137/389, 431, 409

[56] References Cited
UNITED STATES PATENTS

| 2,080,567 | 5/1937 | Ginter et al. | 222/67 X |
| 3,351,239 | 11/1967 | Flock | 222/162 X |

Primary Examiner—Robert B. Reeves
Assistant Examiner—Hadd Lane
Attorney, Agent, or Firm—Arthur Z. Bookstein

[57] ABSTRACT

A hot beverage dispenser for use in locations where it is not desirable or practical to connect the dispenser to a water supply. The hot water system in the dispenser includes an electrically heated tank and a reservoir detachably connected to the tank. The reservoir may be detached to be manually filled and then replaced. An improved self-sealing valve arrangement is employed to seal the reservoir when it is detached and also to control flow from the reservoir to the tank when the reservoir is reconnected.

9 Claims, 5 Drawing Figures

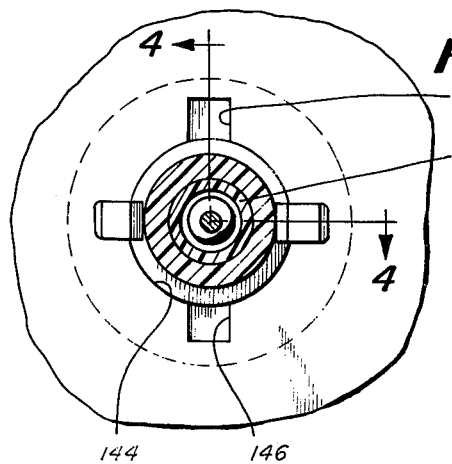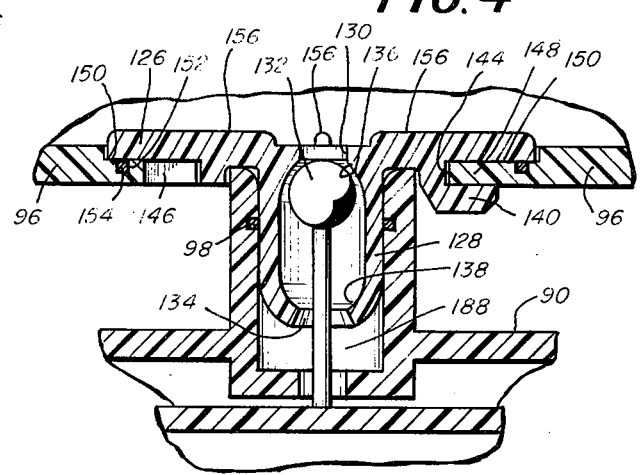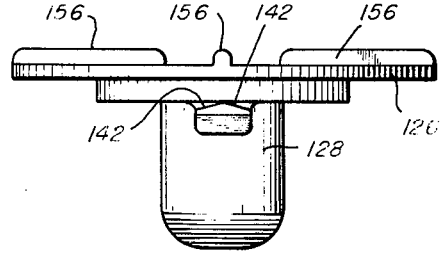

MANUAL FILL HOT BEVERAGE DISPENSER

BACKGROUND OF THE INVENTION

This invention relates to improvements in manually fillable hot liquid dispensers such as those employed to dispense coffee, hot chocolate, soup or the like.

Counter-top hot beverage dispensers ordinarily contain independent supplies of flavor concentrate and hot water. The dispensers mix the two in proper ratio on demand and on a drink-by-drink basis. The hot water system for these units customarily includes a heating tank which is connected either to a pressurized water supply line or is filled manually. Where it is impractical or too costly to connect the tank to a water supply line, or where portability is desired, the manually filled arrangement is employed. Ordinarily, the manually filled tanks have a gravity discharge for the hot water to a mixing chamber where the water is combined with the flavoring concentrate. The available manually filled systems have several disadvantages which are described in U.S. Pat. application Ser. No. 448,352 filed Mar. 5, 1974. That application describes, in general, an arrangement including a heating tank and a separate manually fillable reservoir tank with means to enable water to flow from the reservoir tank to the heating tank as needed. That device, however, contemplates manual filling of the reservoir tank while the reservoir tank remains attached to and mounted atop the dispenser. The present invention relates to an improved valving connection between the reservoir and the dispenser which enables the reservoir to be detached and filled directly and then replaced on the dispenser, thus facilitating the refilling of the reservoir.

SUMMARY OF THE INVENTION

The dispenser includes a conventional heated tank, a float chamber mounted on top of and in communication with the tank and a reservoir which rests on top of the float chamber. The bottom wall of the reservoir has an opening which communicates with the float chamber to enable water to flow from the reservoir into the float chamber and then into the main tank. A valving arrangement is provided in the reservoir opening and is operative in a manner such that when the reservoir is detached, the valving arrangement will close the opening. When the reservoir is subsequently replaced on top of the float chamber an actuator, which protrudes from the float chamber, engages the valving arrangement and causes it to open thus enabling subsequent flow of water from the reservoir.

It is among the objects of the invention to provide an improved hot beverage dispenser having a reservoir which may be detached from the dispenser and filled directly while detached.

Another object of the invention is to provide a reservoir for a hot beverage dispenser having an improved valving arrangement for communicating water from the reservoir to the main heating tank.

DESCRIPTION OF THE DRAWINGS

The foregoing and other objects and advantages of the invention will be understood more fully from the following further description thereof, with reference to the accompanying drawings in which:

FIG. 3 is an enlarged sectional view of the valve as seen along the line 3—3 of FIG. 2;

FIG. 4 is a sectional elevation of the valving arrangement as seen along the line 4—4 of FIG. 3; and FIG. 5 is a side elevation of the valve.

DETAILED DESCRIPTION OF PREFERRED EMBODIMENT

Figures 1, 2:
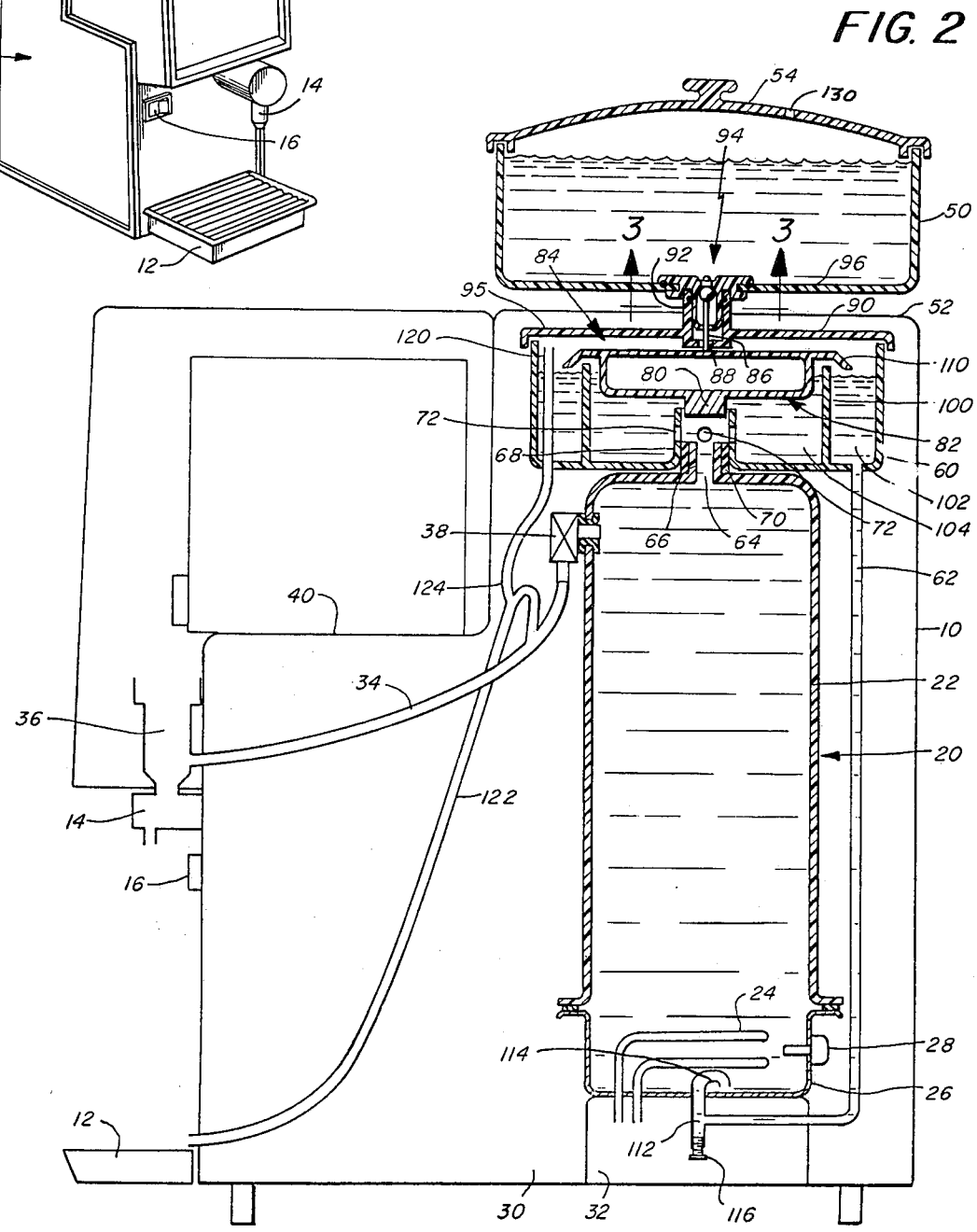
FIG. 1 is a perspective view of a beverage dispenser of the type which may incorporate the invention.
FIG. 2 is a somewhat diagrammatic side elevation, partly in section, of the beverage dispenser shown in FIG. 1 and illustrating the hot water system and the improved valving arrangement.

The dispenser shown in FIGS. 1 and 2 has a housing 10 and is designed to be placed on a counter in a snack bar or other fast food establishment and dispense hot drinks one at a time. In use the cup or container to be filled is placed on or held above drip trip 12 on the front of the housing beneath the mixing assembly and discharge spout 14. An actuating button 16 on the housing is electrically connected to a control circuit (not shown) that includes some form of timer, which causes the dispenser to discharge a drink of a preset volume. The components are of standard design found in hot chocolate dispensers shown for example, in U.S. Pat. Nos. 3,737076; 3,730,144 and 3,568,887.

Disposed in housing 10 is hot water tank 20, which preferably is constructed as the tank shown in U.S. Pat. No. 3,730,144. Because the tank is described in detail in that earlier patent, it is described only briefly here. It includes a plastic shell 22 and stainless steel section 26 in which is mounted an immersion heater 24 at the tank bottom. A thermostat 28 is mounted in the tank to control an electrical circuit (not shown) for the immersion heater. The tank is supported on the bottom wall 30 of the housing by stand 32.

The upper end of tank 20 is connected by duct 34 to the top funnel section 36 of the mixing assembly and discharge spout 14, and solenoid valve 38 interposed in duct 34 at the discharge port in the tank controls the flow of hot water from tank 20 to funnel 36. Conventionally when the dispenser is used to dispense hot chocolate drinks, a container (not shown) for flavor concentrate (either powder or liquid) is placed on shelf 40 forming part of housing 10 and discharges its contents into funnel 36, typically as shown in U.S. Pat. No. 3,568,887.

A water reservoir 50 is mounted on the top wall 52 of housing 10 and serves as a source of water for tank 20. Reservoir 50 has a lid 54 which may readily be removed for filling, as will be described, and preferably the reservoir is made of a transparent or translucent material so that the level of water in the reservoir may be observed without removing the cover. As reservoir 50 fits on top of housing 10 and is not confined within it, it is readily accessible to the operator and may be removed for filling when required. The reservoir is connected to the tank 20 through an auxiliary chamber 60 and transfer duct 62.

Auxiliary chamber 60 located beneath top wall 52 of housing 10 is supported on the top of tank 20, and the auxiliary chamber and tank are in continuous communication with one another. Passage 64 defined by neck 66 on the top wall of tank 20 opens into chamber 60, and neck 66 extends upwardly and registers with sleeve 68, and the two are sealed together by gasket 70. A number of ports 72 in sleeve 68 join the interior of auxiliary chamber 60 with passage 64.

The upper end of sleeve 68 serves as a guide for stem 80 of float 82 forming part of the float valve assembly 84 which controls water flow from reservoir 50 to tank 20. A pin 86 carried by float 82 extends upwardly through an opening 88 formed through a cover 90 for the auxiliary chamber 60. The opening 88 preferably is defined by an upstanding collar 92 formed integrally with the cover 90. The pin 86 protrudes upwardly through the opening 88 to engage and actuate the valving arrangement, indicated generally by the reference character 94 in the reservoir 50 and in a manner which is described below.

Auxiliary chamber 60 is subdivided into two compartments by cylindrical partition 100. Outer annular compartment 102 is connected at its bottom to transfer duct 62 while inner compartment 104 is connected to the interior of tank 20 through passage 64 and ports 72 in the manner previously described.

Float 82 carries an outwardly extending flange 110 that extends over the top of cylindrical partition 100 and serves as a baffle so as to direct water that flows from reservoir 50 through opening 88 in cover 90 into outer annular compartment 102. Thus, flow from the reservoir 50 to tank 20 normally occurs through the valving arrangement 94, opening 88 over baffle or flange 110, down through annular compartment 102 and transfer duct 62, and up T-connection 112 and diverter 114. A drain plug 116 is shown in the bottom of T 112 to drain the system as necessary.

A vent tube 120 open at its upper end in auxiliary chamber 60 above the normal operating water level in the chamber maintains the inside of the chamber at atmospheric pressure through line 122, which terminates at its lower end in the front panel of housing 10 above drip tray 12. Line 122 is also connected by means of a Y-connection 124 to discharge duct 34. This venting arrangement prevents any hot water from being trapped in discharge duct 34 and causes a malfunction of the hot water system to create water discharge into the drip tray 12 where it may readily be observed. The reservoir 50 is also maintained at atmospheric pressure through vent 130 in cover 54.

Typically hot water tank 20 may have a one gallon capacity and reservoir 50 may have a capacity of 1 or 2 gallons, and annular compartment 102 of chamber 60 may have a capacity of approximately 0.1 gallon.

The valving arrangement 94 preferably is formed as a separate member and is secured to the bottom wall 96 of the reservoir 50. As shown in FIGS. 3-5, the valving arrangement may be of one piece molded plastic construction and includes a generally round mounting disk 126. A sleeve 128 is formed integrally with the disk 126 and extends downwardly. An orifice 130 is formed centrally through the disk 126 and communicates with the hollow interior of the sleeve 128 to define a flow passage from the reservoir 50 when the valving arrangement is connected to the bottom wall 96 of the reservoir 50 as will be described. Sleeve 128 is long enough so that when the reservoir with the valving arrangement is mounted on top of the dispenser, the lower end of the sleeve 128 will extend downwardly into the opening 88 in the cover 90. A gasket 98 may be provided between the sleeve 128 and collar 92 which defines the opening 88. A ball valve 132 is contained within the sleeve 128 and is movable freely therein between an upper position in which the ball 132 obstructs orifice 130 and a lower position in which the ball 132 obstructs the lower outlet end 134 of the sleeve 128. The ball 132 is of larger diameter than that of the orifice 130 but is smaller than the inner diameter of the sleeve so that when the ball is unseated water will flow through the sleeve. The lower end of the sleeve 128 is turned inwardly as shown to define an outlet 134 which also is smaller in diameter than the ball 132. The upper surface 136 of the sleeve passage as well as the lower internal surface 138 of the sleeve preferably are rounded to define a good seat for the ball 132 in each of its upper and lower positions.

The valving arrangement may be secured to the bottom wall 96 of the reservoir 50 by a variety of suitable connections. In the embodiment shown, the valve attaching means includes a pair of diametrically opposed fingers 140 formed integrally with the underside of the disk opposite sides of the sleeve 128. Each of the fingers 140 extends generally radially outwardly and their outward ends are spaced below the underside of the disk 126. The upwardly facing surfaces 142 of the fingers may be beveled as shown. The bottom wall 96 of reservoir 50 has an opening 144 through which the sleeve 128 protrudes. A pair of outwardly extending diametrically opposed slots 146 are formed in the bottom wall to receive the fingers 140 and then to permit the entire valve body to be rotated to lock the marginal portion 148 of the bottom wall between the underside of the disk and the opposed fingers 140. The bottom wall 96 may be formed with a shoulder 150 so that the assembled valve member and bottom wall join smoothly and continuously as shown. An annular groove 152 may be formed in the shoulder 150 to receive an O-ring 154 to enhance the seal between the disk 126 and bottom wall 96. It also is preferred to provide a number of radially extending ribs 156 on the top surface of disk 126 to facilitate rotation of the disk 126 into a secured position as well as to provide increased rigidity for the disk 126.

In operation, assuming that the system is dry, the entire reservoir 50, with the valving arrangement securely in place, may be removed as a unit and brought to an appropriate water tap where the reservoir may be filled. The ball valve 132 is in firm engagement with the lower surface 138 of sleeve 128 to retain water in the reservoir 50 without leaking. The filled reservoir 50 then may be returned to the dispenser and replaced in its normal operating position. Assuming that the system was initially dry, as the sleeve 128 is inserted through the opening 88 and the cover 90 of chamber 60, the upwardly protruding pin on the float 82 will engage the ball 132 as the reservoir 50 is lowered into position. As the ball 132 unseats water can flow from the reservoir 50 through the orifice 130 and the sleeve 128 into the chamber 60. The water flowing into chamber 60 will flow over baffle 110 into annular compartment 102 and through transfer duct 62 and diverter 114 into tank 20. The water level in tank 20 rises, and when the tank is full, the water level will continue to rise and enter inner compartment 104 of chamber 60 through passage 64 and ports 72. The float will continue to rise until its pin 86 urges the ball valve 132 into firm seating arrangement with the upper end 136 of the inner region of the sleeve 128 to shut off flow through the orifice 130. With the tank full, the power switch (not shown) may be turned on to energize heater 24 to heat the water in tank 20 to the desired temperature. The water in compartment 104 will be heated to the same temperature, while the temperature of the water in outer compartment 102 will be somewhat less than that in the tank.

If the water level in compartments 102 and 104 of chamber 60 is as shown in FIG. 2, only the water in the inner compartment 104 would be heated due to its direct fluid communication with the hot water tank. However, as the cold water from the initial fill expands upon being heated in tank 20, the water level in compartment 104 rises and will ordinarily overflow the annular partition 100. When this occurs the temperature of the water in annular compartment 102 will also rise. An observable pumping action takes place due to the difference in temperature between compartments 104 and 102 whereby the cooler water flows down transfer duct 62 into the bottom of tank 20 as the hot water in inner compartment 104 overflows partition 100.

When a drink is drawn from the dispenser, the level of water in compartments 102 and 104 will drop. As the water level in compartment 104 drops, the float and pin 86 also drop which unseats the ball 132 to unblock orifice 130. This enables water to flow from the reservoir 50 into the chamber 60 to replenish the system. All incoming water will be routed by means of baffle 110 to the outer compartment 102. The water exiting from the tank 20 through solenoid valve 38 will normally be the hottest water in the system because the cold water entering the tank normally displaces the hot water upwardly in the tank. It should be observed that the diverter 114 minimizes turbulence in the tank when the cold water is introduced so as to prevent mixing of the cooler water entering the tank with the hot water already heated in it. The hot water is merely displaced upwardly without being reduced in temperature.

It should also be recognized that the difference in height between the solenoid valve outlet 38 and the level of water in compartment 104 is maintained by the float valve assembly 84. So long as there is water in reservoir 50, the discharge rate from the tank as drinks are withdrawn is not effected by a drop in level in the reservoir 50.

Because the reservoir 50 is remote from the hot water in tank 20 and chamber 60, the temperature of the water in the reservoir remains substantially ambient, and there is minimum evaporation and no danger of being scalded by splashing water from the reservoir as water is added to it. Moreover, because the water in the tank 20 and chamber 60 is open only by vent tube 120 to the atmosphere, evaporation losses are minimized.

It will be appreciated that with the foregoing arrangement, the reservoir may be filled easily and with greater convenience, it being unnecessary to employ separate containers to transfer the water from the tap to the reservoir 50. It should be understood, however, that the foregoing description of the invention is intended merely to be illustrative thereof, and that other modofications and embodiments may be apparent to those skilled in the art without departing from its spirit. Therefore, it is not intended to limit the breadth of the invention to the single embodiment illustrated and described. Rather, it is intended that its scope be defined by the appended claims and their equivalents.

Having thus described the invention, what is claimed is:

1. A beverage dispenser comprising:
   a liquid storage and delivery system;
   a reservoir tank for holding a volume of liquid, said reservoir tank having an outlet;
   means for detachably connecting the reservoir tank to the liquid storage and delivery system to effect communication between the reservoir tank and the liquid storage and delivery system through the outlet to enable liquid to flow from the reservoir tank to the liquid storage and delivery system and to enable the reservoir tank to be completely separated from the system;
   a valve member mounted to the reservoir tank and being operable to open or close the outlet;
   said system including means responsive to the quantity of liquid in said liquid storage and delivery system, said responsive means being cooperative with the valve means for opening the valve means in response to connection of the reservoid tank with the system, and for closing the outlet in response to detachment of the reservoir tank from the system, and for controlling the flow of liquid through the outlet when the reservoir tank and system are connected by closing the outlet when the volume of liquid in the liquid storage and delivery system has reached a predetermined magnitude.

2. A beverage dispenser as defined in claim 1 wherein said cooperative means comprises:
   a float having an actuating member attached thereto for movement in unison therewith, the actuating member being located to engage said valve member when the reservoir is connected to the system.

3. A beverage dispenser comprising:
   a liquid storage and delivery system;
   a reservoir tank for holding a volume of liquid, said reservoir tank having an outlet;
   means for detachably connecting the reservoir tank to the liquid storage and delivery system to effect communication between the reservoir tank and the liquid storage and delivery system through the outlet to enable liquid to flow from the reservoir tank to the liquid storage and delivery system and to enable the reservoir tank to be completely separated from the system;
   valve means associated with the reservoir tank for closing the outlet in response to detachment of the reservoir tank from the system, the valve means including a sleeve surrounding the outlet and extending downwardly from the bottom of the reservoir tank, the sleeve having valve seats defined at opposition ends thereof;
   the valve means further including a valve member movably mounted within the sleeve and cooperative with the valve seats to alternately seal either of the ends of the sleeve; and
   said system including an actuator cooperative with the valve member to urge the valve member toward one of the valve seats when the reservoir tank is connected to the system, said valve member being movable toward the other of the valve seats to close the outlet in response to detachment of the reservoir tank from the system.

4. A beverage dispenser as defined in claim 3 further comprising:
   the lower end of the sleeve being open and defining a lower of one of said valve seats; and
   the actuator being receivable through the open lower end of the sleeve to engage the valve member.

5. A beverage dispenser as defined in claim 4 wherein the valve member comprises a ball having a diameter smaller than that of the interior of the sleeve.

6. A beverage dispenser as defined in claim 3 wherein the valve means is detachable from the reservoir chamber.

7. A beverage dispenser as defined in claim 6 wherein the valve means is detachable from the reservoir tank by means comprising:

valve means including a disk connected to the sleeve at the upper end of the sleeve;

means defining a hole in the reservoir tank to receive the sleeve;

the disk in the tank being constructed and arranged to enable the disk to be secured to the tank about the region of the hole in the tank and in a sealed configuration.

8. A beverage dispenser as defined in claim 7 wherein the disk is secured to the tank by means comprising:

a pair of fingers secured to the underside of the disk, the fingers extending generally radially outwardly and being spaced from the underside of the disk;

the hole in the reservoir wall including a pair of radial slots to receive the fingers;

means on the topside of the disks to facilitate rotation of the disk after insertion of the sleeve through the hole in the reservoir tank;

the fingers on the other side of the reservoir wall being constructed and arranged as to wedge into a tight fit in response to rotation of the disk.

9. A beverage dispenser as defined in claim 3 further comprising:

the cooperative means includes a float and an actuator mounted to the float for movement therewith;

the float being movable between a first position in which the actuator maintains the valve member between the valve seats and a second position in which the actuator urges the valve firmly against one of the valve seats.

* * * * *